May 12, 1931.  G. WISTRAND  1,804,909
MOUNTING FOR NONDRIVEN ROLLS
Filed Jan. 20, 1930

INVENTOR
GUNNAR WISTRAND
BY
ATTORNEY

Patented May 12, 1931

1,804,909

UNITED STATES PATENT OFFICE

GUNNAR WISTRAND, OF BERLIN, GERMANY, ASSIGNOR TO AKTIEBOLAGET SVENSKA KULLAGERFABRIKEN, OF GOTTENBORG, SWEDEN, A CORPORATION OF SWEDEN

MOUNTING FOR NONDRIVEN ROLLS

Application filed January 20, 1930, Serial No. 422,013, and in Germany March 12, 1929.

Considerable difficulty is encountered in mounting antifriction bearings in a support fixed to the frame of a machine when applying such bearings to non-driven rolls, such as the guide rolls of paper machines. One possible solution of this problem is to mount the bearings in a special dumbbell-shaped housing fitted in the support. In this case it is, however, necessary to make the neck spherical in order to compensate for the bending of the roll and to permit of one end of the roll being lifted. The bending of the roll is compensated for by a relative movement of the spherical surfaces under sliding friction. Additional forces are thus brought into play which must be taken up by the bearing, thus forcing the bearing to carry an extra load. A further disadvantage is that it is absolutely necessary to mount two radial bearings, which makes the mounting of rollers according to this construction comparatively expensive. Another solution of the problem of mounting guide rolls consists in mounting the bearings inside the rolls on a stationary axle passing from end to end of the roll and providing a special head piece on the axle to rest in the support. This arrangement has the disadvantage that the outer race of the bearing rotates, which is not to be desired inasmuch as the life of the bearing is shorter than when the inner race rotates, the load being the same in both cases. The rotating outer race also requires a tight fit in the housing, which makes the bearing more difficult to mount.

The invention is illustrated in the accompanying drawing, in which

Figure 1:
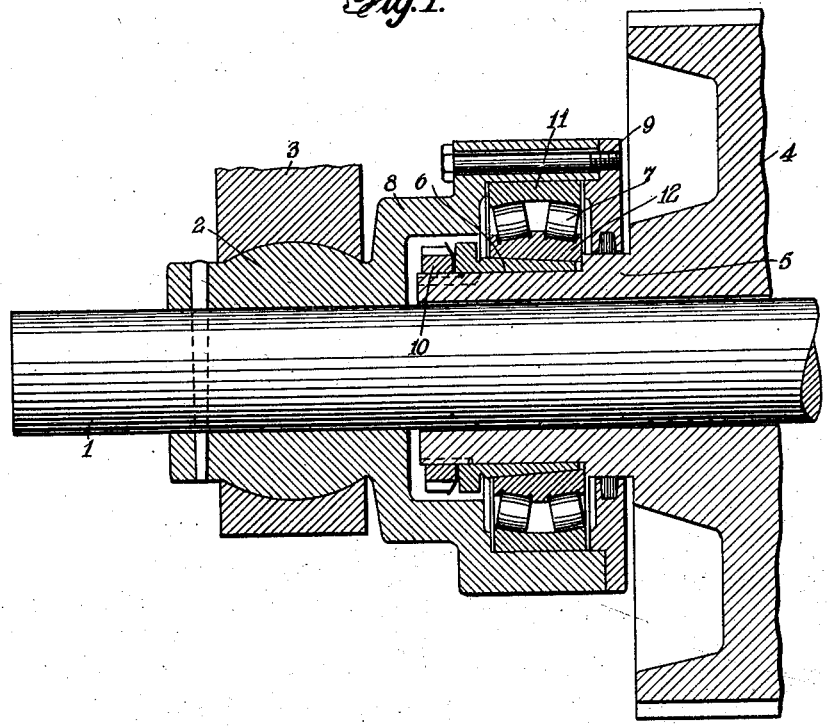
Figure 1 shows an axial section through the mounting.
Figure 2:
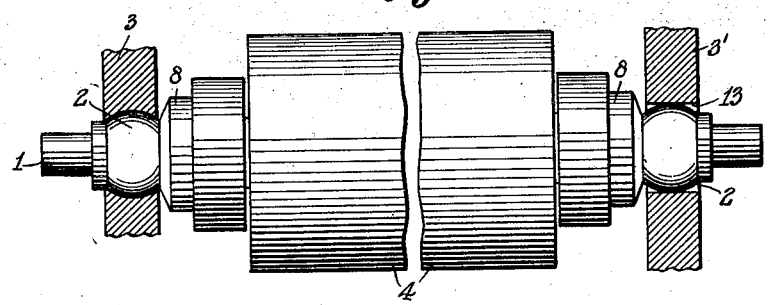
Fig. 2 shows the general arrangement of the roll and the mountings on both sides.

Referring to Figure 1, the part 2 of the housing is fixed to the stationary axle 1 which passes through the roll 4 from end to end. The part 2 is made spherical on its outer surface and rests in a support 3. In the form of the invention illustrated the seating on the support 3 on one side is also spherical, while at the opposite side it is cylindrical as may be seen from Fig. 2. In this manner the roll is guided in an axial direction on one side. The part 2 of the housing is fixed to the axle in any suitable manner, for instance by means of a key as illustrated. The housing is enlarged at one side to form a housing portion 8 to receive the bearing 7. The outer race 11 of the bearing is mounted in the portion 8, while the inner race 12 is fixed to the neck 5 of the roll 4 by means of a taper sleeve 6. The sleeve 6 is held in place by a nut 10. It is of course also possible to make use of other methods of fixing the inner race. The housing is sealed on the side nearest the roll by means of a cover 9. The antifriction bearing is shown as being of the self-aligning roller type. When the roll or its axle bend, the movement is taken up in the bearing. The lateral movement of the housing 8 in the support 3 as the roll is adjusted is made possible by the movement of the part 2 in the cylindrically formed part 13 of the support 31. It is also possible to compensate in this manner for a small dislocation due to the lateral temperature differences. This freedom of movement can also be obtained in other ways. It is, for instance, possible to make use of spherical support seatings on both sides of the roll and allow the movement to take place between the axle 1 and the housing part 2. In this case it will be necessary to fix the housing to the axle at one end.

The invention has its greatest use on guide rolls for paper machines. It can, however, also be used for other non-driven rolls, and various changes may be made within the scope of the claims without departing from the spirit of my invention.

Having described my invention, I claim and desire to secure by Letters Patent:

1. A mounting for non-driven rolls comprising a funnel-shaped bearing housing resting with its narrow part in a support and fixed to a stationary axle passing through the roll, and an antifriction bearing mounted with its outer race in said housing inward of the support and having its inner race mounted on the neck on the end of the roll.

2. A mounting according to claim 1, wherein the narrow part of the housing is spherical in form and rests in a spherical seating in the support.

3. A mounting comprising a pair of mountings according to claim 1, wherein both housings are spherical in form at their narrow parts, one housing resting with its spherical part in a spherical seating in a support, and the other housing resting with its spherical part in a cylindrical seating in the other support.

4. A mounting for non-driven rolls comprising a pair of funnel-shaped housings spherical in form at their narrow parts, each housing resting with its spherical part in a spherical seating in a support, and each containing an antifriction bearing mounted with its outer race in the housing and with its inner race on a neck on the end of the roll, one housing being fixed to a stationary axle passing through the roll and the other housing being capable of axial adjustment on the axle.

5. The combination with a support, of a roll having a neck at its end, a mounting comprising a funnel-shaped bearing housing resting with its narrow part in the support and fixed to a stationary axle passing through the roll, the stationary axle, and an antifriction bearing mounted with its outer race in said housing inward of the support and having its inner race mounted on the neck on the end of the roll.

6. A mounting according to claim 1, wherein the support is formed with a spherical seating and the narrow part of the housing is of spherical form and rests in such spherical seating.

7. The combination with a hollow roll having a neck at each of its ends, a bearing mounted on each of the necks, a housing having a portion surrounding the bearing and a portion extending longitudinally thereof, such longitudinal extending portion having a spherical formation and means for bonding the housings together.

Signed at Berlin, Germany, this 19th day of December, 1929.

GUNNAR WISTRAND.